US012381848B1

(12) United States Patent
Stern et al.

(10) Patent No.: US 12,381,848 B1
(45) Date of Patent: Aug. 5, 2025

(54) SYSTEM FOR PRODUCING E-COMMERCE PRODUCT VIDEOS

(71) Applicant: Glossi, Inc., Los Angeles, CA (US)

(72) Inventors: David Stern, Los Angeles, CA (US); Jacob William Black, Los Angeles, CA (US); Jonathan M. Gitlin, Los Angeles, CA (US); Michael Gadd, Los Angeles, CA (US); Greg Bolton, Santa Clarita, CA (US); Kyle Dail, Downey, CA (US); Rachael McDonald, Los Angeles, CA (US); Jacob Backer Schwartz, Manhattan Beach, CA (US); Steven Walther, Los Angeles, CA (US)

(73) Assignee: Glossi, Inc., Los Angeles, CA (US)

( * ) Notice: Subject to any disclaimer, the term of this patent is extended or adjusted under 35 U.S.C. 154(b) by 0 days.

(21) Appl. No.: 18/197,976

(22) Filed: May 16, 2023

Related U.S. Application Data

(63) Continuation of application No. 17/739,195, filed on May 9, 2022, now Pat. No. 11,683,290, which is a continuation-in-part of application No. 16/930,273, filed on Jul. 15, 2020, now abandoned.

(51) Int. Cl.
*H04L 9/40* (2022.01)
*G06Q 30/0601* (2023.01)
(52) U.S. Cl.
CPC ..... *H04L 63/0236* (2013.01); *G06Q 30/0643* (2013.01); *H04L 63/101* (2013.01); *H04L 63/126* (2013.01); *G06Q 30/0623* (2013.01)

(58) Field of Classification Search
CPC . H04L 63/0236; H04L 63/101; H04L 63/126; G06Q 30/0643; G06Q 30/0623
See application file for complete search history.

(56) References Cited

U.S. PATENT DOCUMENTS

| | | | | |
|---|---|---|---|---|
| 5,689,669 A | * | 11/1997 | Lynch | G06F 3/0481 715/848 |
| 6,002,853 A | * | 12/1999 | de Hond | G06F 16/954 709/219 |
| 6,119,147 A | * | 9/2000 | Toomey | G06Q 10/109 719/329 |
| 6,219,045 B1 | * | 4/2001 | Leahy | H04L 67/10 709/204 |
| 6,243,091 B1 | * | 6/2001 | Berstis | G06F 3/04815 715/205 |
| 6,271,843 B1 | * | 8/2001 | Lection | G06T 15/00 715/848 |

(Continued)

*Primary Examiner* — Nicholas Augustine
(74) *Attorney, Agent, or Firm* — Nixon Peabody LLP

(57) ABSTRACT

A computer-implemented improved system for producing studio quality e-commerce product videos displaying a 3D rendering created from a 3D model of a product that includes generally the steps of uploading a 3D model of the consumer product onto a computer or an online platform; selecting product features for highlighting in the video; rotating the 3D model to identify selected features; providing text to highlight portions of the video and the selected features; selecting and providing musical accompaniment for the video; and, creating a timeline to establish the sequence of individual portions of the video whereupon the 3D rendered video is then automatically generated for the vendor's e-commerce product page and various social platforms.

20 Claims, 11 Drawing Sheets

(56) References Cited

U.S. PATENT DOCUMENTS

| | | | | |
|---|---|---|---|---|
| 6,362,817 B1* | 3/2002 | Powers | G06T 17/00 | 345/428 |
| 6,396,522 B1* | 5/2002 | Vu | G06F 3/04845 | 715/848 |
| 6,414,679 B1* | 7/2002 | Miodonski | G06T 13/00 | 707/999.005 |
| 6,570,563 B1* | 5/2003 | Honda | A63F 13/352 | 345/473 |
| 6,573,903 B2* | 6/2003 | Gantt | G06F 30/00 | 345/619 |
| 6,590,593 B1* | 7/2003 | Robertson | G06F 3/04815 | 715/848 |
| 6,621,508 B1* | 9/2003 | Shiraishi | G06F 3/0481 | 715/764 |
| 6,690,393 B2* | 2/2004 | Heron | G06T 19/00 | 715/848 |
| 6,784,901 B1* | 8/2004 | Harvey | H04L 67/02 | 715/848 |
| 6,954,728 B1* | 10/2005 | Kusumoto | G06Q 30/0241 | 705/14.12 |
| 6,961,055 B2* | 11/2005 | Doak | A63F 13/63 | 345/677 |
| 7,382,288 B1* | 6/2008 | Wilson | G08G 5/0021 | 340/972 |
| 7,414,629 B2* | 8/2008 | Santodomingo | G06T 17/05 | 345/582 |
| 7,467,356 B2* | 12/2008 | Gettman | G06Q 30/02 | 715/850 |
| 7,653,877 B2* | 1/2010 | Matsuda | G06F 16/957 | 463/32 |
| 7,663,625 B2* | 2/2010 | Chartier | G06T 19/20 | 700/182 |
| 7,746,343 B1* | 6/2010 | Charaniya | G06N 7/01 | 345/428 |
| 7,788,323 B2* | 8/2010 | Greenstein | G06Q 10/10 | 715/744 |
| 7,814,429 B2* | 10/2010 | Buffet | G06F 30/00 | 715/763 |
| 7,817,150 B2* | 10/2010 | Reichard | G06T 15/20 | 715/705 |
| 7,844,724 B2* | 11/2010 | Van Wie | H04L 67/131 | 709/227 |
| 9,137,497 B2* | 9/2015 | Tofigh | H04N 21/440263 | |
| 9,781,554 B2* | 10/2017 | Hyde | H04W 4/029 | |
| 10,217,185 B1* | 2/2019 | Cabanero | H04L 67/10 | |
| 11,416,900 B1* | 8/2022 | Haba, Jr. | G06F 3/04842 | |
| 2001/0018667 A1* | 8/2001 | Kim | G06Q 30/0277 | 705/14.73 |
| 2002/0095463 A1* | 7/2002 | Matsuda | G06F 16/957 | 709/204 |
| 2002/0113820 A1* | 8/2002 | Robinson | G06F 16/954 | 715/764 |
| 2005/0093719 A1* | 5/2005 | Okamoto | G01C 21/3697 | 705/14.62 |
| 2005/0128212 A1* | 6/2005 | Edecker | G06T 17/05 | 345/581 |
| 2006/0053066 A1* | 3/2006 | Sherr | G06Q 10/10 | 705/26.8 |
| 2006/0161838 A1* | 7/2006 | Nydam | G06F 40/169 | 715/201 |
| 2006/0174209 A1* | 8/2006 | Barros | G06F 3/0483 | 715/764 |
| 2007/0179867 A1* | 8/2007 | Glazer | G06Q 30/0613 | 705/26.8 |
| 2008/0134056 A1* | 6/2008 | Shuster | A63F 13/12 | 715/757 |
| 2008/0204449 A1* | 8/2008 | Dawson | H04L 67/131 | 345/419 |
| 2008/0215975 A1* | 9/2008 | Harrison | A63F 13/213 | 715/706 |
| 2008/0215994 A1* | 9/2008 | Harrison | H04L 67/131 | 715/757 |
| 2008/0235320 A1* | 9/2008 | Joy | G06T 19/00 | 709/201 |
| 2008/0235570 A1* | 9/2008 | Sawada | G06Q 10/10 | 356/3 |
| 2008/0307066 A1* | 12/2008 | Amidon | G06Q 30/02 | 709/217 |
| 2009/0063983 A1* | 3/2009 | Amidon | G06N 3/006 | 715/733 |
| 2009/0231492 A1* | 9/2009 | Wayne | G11B 27/322 | 348/E5.022 |
| 2010/0030578 A1* | 2/2010 | Siddique | G06Q 20/12 | 705/26.1 |
| 2010/0138480 A1* | 6/2010 | Benedetto | H04N 7/17318 | 348/157 |
| 2013/0215116 A1* | 8/2013 | Siddique | G06Q 20/40 | 705/26.7 |
| 2014/0280272 A1* | 9/2014 | Choque | G06F 16/137 | 707/758 |
| 2014/0304823 A1* | 10/2014 | Landwehr, Jr. | H04L 63/10 | 726/26 |
| 2014/0368537 A1* | 12/2014 | Salter | G06F 3/011 | 345/633 |
| 2016/0210602 A1* | 7/2016 | Siddique | G06Q 20/047 | |
| 2017/0038828 A1* | 2/2017 | Cho | G06T 17/20 | |
| 2017/0102766 A1* | 4/2017 | Hayashida | G06F 3/147 | |
| 2017/0133055 A1* | 5/2017 | Axen | H04N 21/6543 | |
| 2017/0249553 A1* | 8/2017 | Sellers-Blais | G06N 5/022 | |
| 2018/0075658 A1* | 3/2018 | Lanier | G06T 11/001 | |
| 2018/0084242 A1* | 3/2018 | Rublee | G06F 18/22 | |
| 2018/0114343 A1* | 4/2018 | Mitchell | G06V 10/955 | |
| 2018/0165730 A1* | 6/2018 | Norman | G06Q 30/06 | |
| 2018/0253897 A1* | 9/2018 | Satake | A63F 13/215 | |
| 2019/0199993 A1* | 6/2019 | Babu J D | G06T 15/08 | |
| 2021/0264686 A1* | 8/2021 | Prunier | G06Q 10/10 | |

\* cited by examiner

SYSTEM FOR PRODUCING E-COMMERCE PRODUCT VIDEOS

This application is a Continuation of prior application Ser. No. 17/739,195 filed on May 9, 2022, which is a Continuation-In-Part to application Ser. No. 16/930,273 filed on Jul. 15, 2020.

FIELD OF THE INVENTION

The invention comprises an improved system for producing e-commerce product videos. More particularly, the invention enables professionals, and the average small business person absent any special skills or knowledge and without any contributions from a team of specialists and multiple software packages, to create a studio quality video for pri-marily online use for promoting and explaining a new and/or innovative product.

BACKGROUND OF THE INVENTION

E-commerce product videos for use in marketing and promoting consumer products are not new in the marketplace. Although relatively commonplace, most such videos are definitely the product of a highly sophisticated and skilled professional effort. Professionally produced high quality e-commerce product videos are understandably very expensive to create requiring a team of specialists consisting of, for example, a graphic designer, editor, copywriter and producer supported by multiple software packages. Professionally produced videos are not affordable to most small businesses and start up enterprises. Therefore, attempts by small business or start-up owners to advertise and market a product employing a self-produced e-commerce consumer product video will almost always fall vastly short of achieving the successful result that the business owner would otherwise have hoped for. Producers of studio-quality e-commerce product videos also desire a more efficient and cost-effective system for producing these same types of videos for their own clients.

The improved system has two objectives. The first is aimed at giving businesses stu-dio-quality video content across all social channels to fit the vendor's limited budget and achieving this without the contributions of a professional team consisting of, for example, a copywriter, producer, graphic designer, and editor, and multiple software packages. The other objective targets the need of professional vendors giving them the same capabilities as before but with greater efficiency at much less cost.

Thus, until now, and for the reasons stated, nothing in the prior art provides for an improved system utilizing the user's own computer and software, the computer and an offsite server or the computer and the Cloud for the economic and simplified production of sophisticated studio quality e-commerce product videos. Moreover, nothing in the prior art has enabled the professional vendor of studio quality e-commerce product videos to achieve the production of the same high quality product using the simplified and cost effective improved system of the present invention.

SUMMARY OF THE INVENTION

The present invention comprises a computer-implemented improved system for producing studio quality e-commerce product videos displaying a 3D rendering created from a 3D model of a product that includes generally the steps of uploading a 3D model of the consumer product onto a computer or an online platform; selecting product features for highlighting in the video; rotating the 3D model to identify selected features; providing text to highlight portions of the video and the selected features; selecting and providing musical accompaniment for the video; and, creating a timeline to establish the sequence of individual portions of the video whereupon the 3D rendered video is then automatically generated for the vendor's e-commerce product page and various social platforms, as determined.

Accordingly, it is an object of the present invention to provide a computer-implemen-ted improved system for producing a studio-quality e-commerce 3D rendered product video for use in advertising and marketing consumer products.

A further object of the present invention is to provide a computer-implemented improved system for producing a studio-quality e-commerce 3D rendered product video that utilizes a 3D model of the product as its centerpiece.

Another object of the present invention is to provide a computer-implemented improved system for producing a studio-quality e-commerce 3D rendered product video without the need for the individual contributions of a professional copywriter, producer, graphic designer and editor and multiple software packages in the process.

Another object of the present invention is to provide a computer-implemented improved system for producing a studio-quality e-commerce 3D rendered product video more quickly, efficiently and for much less cost.

Still another object of the present invention is to provide a computer-implemented improved system for producing a studio-quality e-commerce 3D rendered product video that are simple to use and affordable to small business owners and start ups.

Other objects and advantages of the present invention in all of its embodiments will become apparent in the following specifications when considered in light of the attached drawings wherein the preferred and alternative embodiments of the present invention may be further illustrated.

BRIEF DESCRIPTION OF THE DRAWINGS

FIG. 2.b is a flowchart illustrating a step integral to a computer-implemented improved system for producing studio-quality e-commerce product videos according to the teachings of the present invention.

FIG. 6.*b* is a flowchart illustrating a step integral to a computer-implemented improved system for producing studio-quality e-commerce product videos according to the teachings of the present invention.

DETAILED DESCRIPTION OF THE PREFERRED EMBODIMENT

Figure 1:
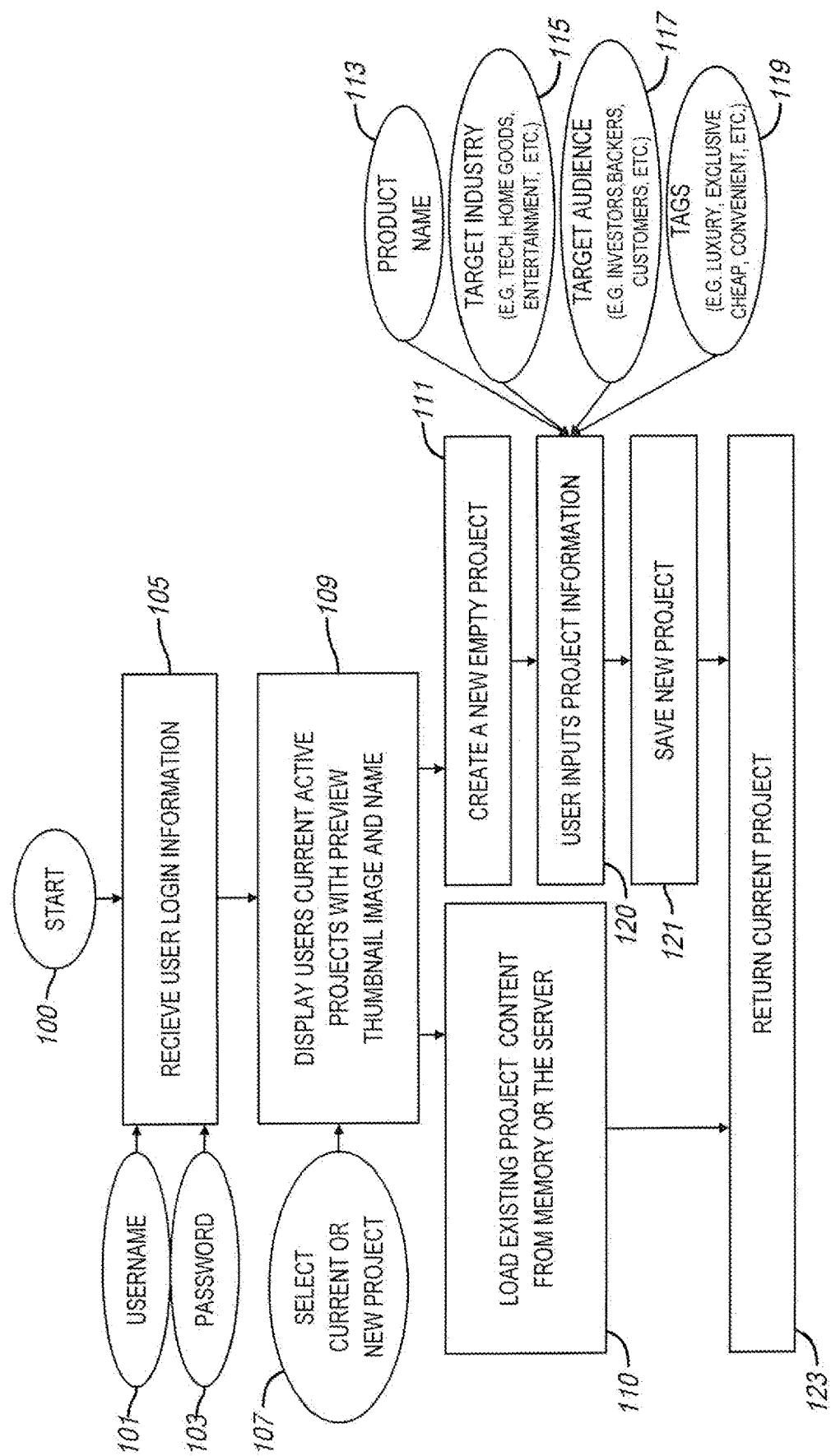
FIG. 1 is a flowchart illustrating a step integral to a computer-implemented improved system for producing studio-quality e-commerce product videos according to the teachings of the present invention.

According to the preferred embodiment of the present invention, a user-controlled computer-implemented system for producing improved e-commerce product videos displaying a 3D rendering of the product created from a 3D model of the product having features and shots and internal and external components comprises the steps of: establishing a connection for the system locally on a computer having the requisite software, between the computer and an offsite server, or between the computer and the Cloud, all of these con-nections utilizing a web portal accessible by logging in using a personal user name and password; identifying and selecting the 3D model of the product from the group comprised of a concept rendering, technical engineering, thematic and manufacturing drawings, blue-prints, and pro-motional materials available online or otherwise, and at least one other depicting the 3D model, wherein the concept rendering, drawings, blueprints and promotio-nal materials depict external and internal components of the product; creating a file for a new or updated profile for the 3D model and assigning a name to the 3D model; identifying a target industry for the product from the group comprised of technology, home goods, per-sonal care, fitness, entertainment and at least one other; identifying a target audience for the product from the group comprising investors, distributors, retail customers and at least one other; identifying a branding theme for the product from the group comprised of luxury, exclusive, inexpensive, fun and at least one other; saving the data comprising the 3D mod-el profile and the identified target industry, target audience, and branding theme to the 3D model file on the computer; selecting the 3D model file from among the new or updated 3D model file profiles on the computer; uploading the 3D model file data from the computer to the offsite server or to the Cloud and correspondingly downloading the 3D model file data to the computer, as needed; identifying and saving the product components to the 3D model file on the computer according to shared common materials and geometric and volumetric sizes and shapes wherein the shared common materials and geometric and volumetric sizes and shapes are compared and commonly grouped; identifying internal components of the product using ray traces directing light rays toward the center of the 3D model wherein these components may be identified and eliminated from the 3D model, as the user elects, with the identified eliminated internal components being saved to the 3D model file on the computer; organiz-ing the 3D model by reducing the number of compo-nents according to consolidated groupings wherein components may be transferred into a different group, added to a new group or eliminated with the identified transferred, added or eliminated components being saved to the 3D model file on the computer; manipulating the 3D model in real time using a camera to orbit the 3D model and relative to the 3D model to zoom in and out for locating key feature points and associating the components with definitions specific to the features, with the key location points and defined component features being saved to the 3D model file on the computer; providing information regarding the features, including name identifier and onscreen text displaying facts explaining how individual components appear, function and interrelate, with the provided information being saved to the 3D model file on the computer; providing a catalog of music with music selec-tions associated with the same key words or terms that identify the branding theme, target audience and target industry, and selecting the music that will conform to the estimated duration and pacing of the 3D product video along a timeline with the associated music selections and the selected conformable music being saved to the 3D model file on the computer; displaying several tabs comprising the content of the timeline, with each tab rep-resenting a feature or shot of the 3D product, and each shot individually generated based on the position of key features of the 3D model, with each display tab representative of a corresponding feature and shot being saved to the 3D model file on the computer; creating a 3D video rendering from the 3D model of the product according to the system of steps of the present invention; and, delivering the 3D video rendering as down-loads or embedda-ble links.

With greater particularity, to start 100 the process, as shown in the flowchart in FIG. 1, the user must establish a connection for the system either locally on the user's own computer having the requisite software or via an offsite server or the Cloud through a web portal employing a personal username 101 and password 103 to login 105. Once logged in, the user can load existing product content from memory or the server 110 or to create a new product profile, create a new project or update an existing one 107, which may be identified by a thumbnail image and name to enable easy access 109. Establishing a new product profile 111 involves naming the product 113 and then, as the user may elect, identifying the target industry 115, e.g. home goods, personal care, fitness, technology, entertainment, etc., and a target audience 117, e.g. investors, customers, etc. To help identify an appropriate theme or tone for the product, choices are available from among specific tags 119, e.g. luxury, exclusive, inexpensive, easy, fun, etc. The project informati-on is uploaded 120 and the data is saved 121. The user may then later return to the cur-rent project 123.

An example of a product profile for which the present invention may be employed is a smartphone product, which shall be named "myPHONE", and the user will create by first selecting the target industry (for example, "technology") followed by a subcategory, such as "mobile devices." Since this product targets high end consumers, the target aud-ience would be "customers", and for the desired brand message, the user may then select among various tags, including, for example, "exclusive", "premium" and "luxury".

Figure 2A:
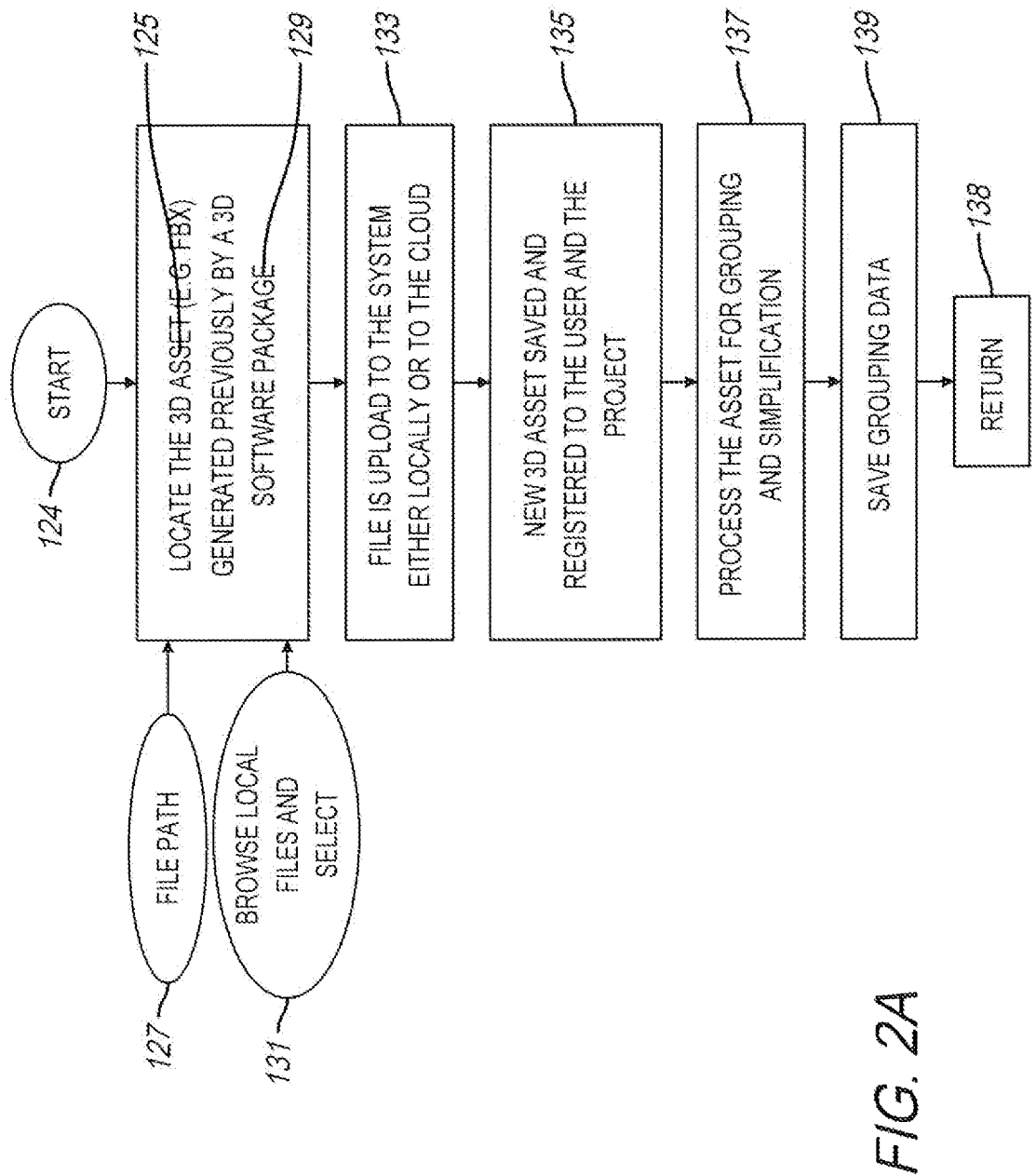
FIG. 2.a is a flowchart illustrating a step integral to a computer-implemented improved system for producing studio-quality e-commerce product videos according to the teachings of the present invention.

Step 2 in the process, as shown in the flowchart in FIG. 2*a*, starts 124 by using the appropriate file path 127 to locate an existing 3D model of the product (also known as a 3D asset) 125 generated from a source (e.g. software package 129) consisting of, for ex-ample, a concept rendering, technical engineering, manufacturing and schematic drawings, blueprints or promotional materials depicting the model. The 3D asset or product file is saved 135 in a proprietary film format (e.g., fbx), which is used to provide interoperability between digital content creation applications. In the present scenario, to upload the 3D asset file, the user first clicks a button labeled "Upload a New Model", which produces a pop-up window to permit the user to browse the local computer files 131. A 3D asset file is then selected for use in the processing of the product profile and then either uploaded locally to the user's own computer software or uploaded to an offsite hosted server or the Cloud 133. A progress tracking bar is displayed and can be observed by the user as the 3D model is uploaded and processed. The system of the present invention analyzes the 3D model of the product to best identify the various components of the product that are made from the same materials and to further identify the components that can be grouped 137 into single pieces, all of which are then saved 139. An example relative to the 3D model of the myPHONE in the instant case are symmetrical pieces comprising the metal bezel framing the screen, which typically share a common material, i.e. metal and, thus, may be grouped together. The user may then return 138 to any step in the sequence of data entries in the system.

Figure 2B:
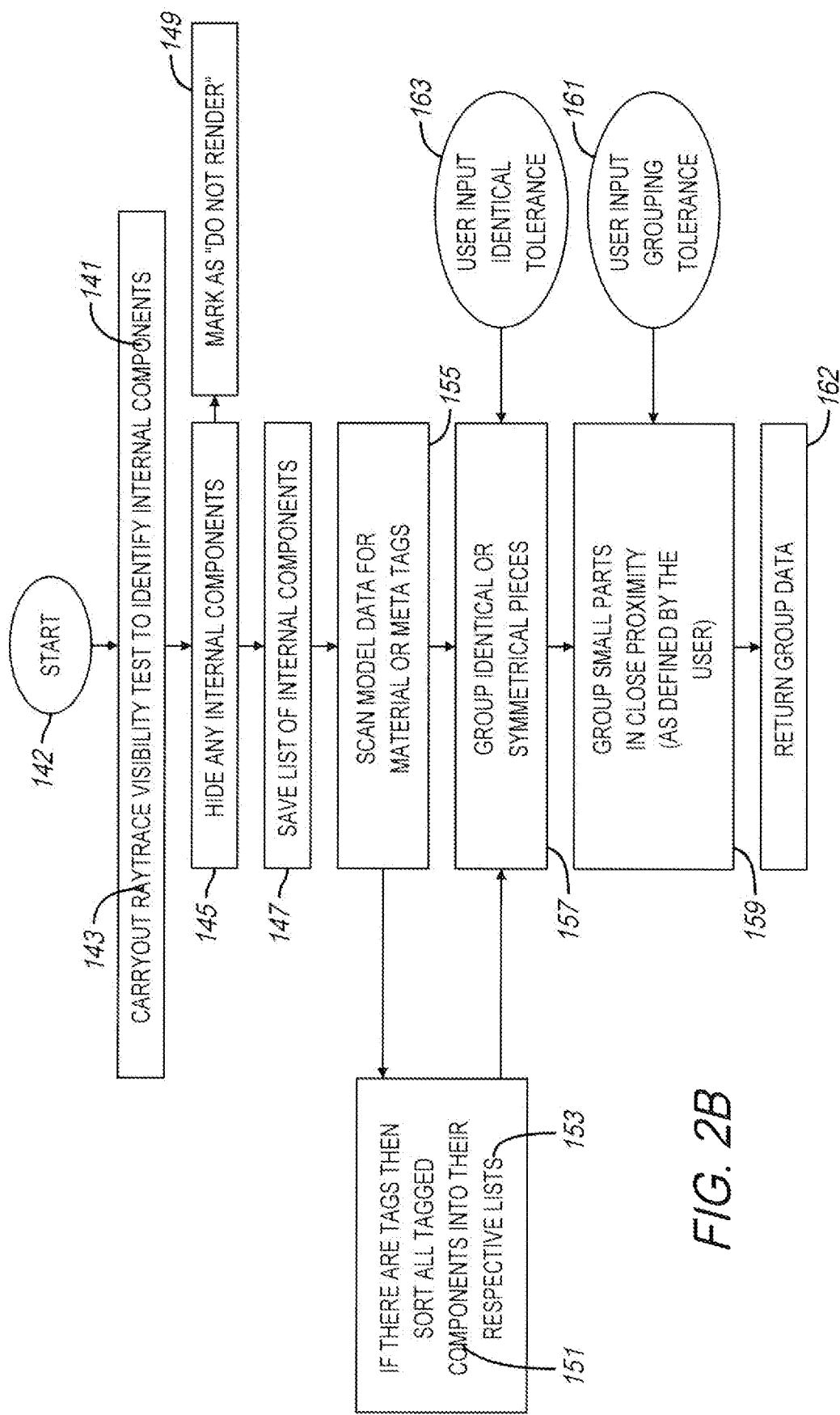

Another aspect of the system of the present invention, as shown in FIG. 2b, starts 142 with the identification and exclusion of certain internal components 141 of the product. This is accomplished by simulating many light rays, also known as ray traces 143, that are emitted from points around the model and directed inwards toward the model's center. Model components are thus identified and located and parts that are determined to be completely occluded may be eliminated or hidden 145 from the model renderings and mar-ked 149. A list of internal components is then saved 147. In the "myPHONE" example, since the speakers and vibration units in the engineered model are internal and, thus, hid-den from view, they may be removed from the rendering. Internal components may be eliminated from the system entirely or grouped together and held in the system to be accessed and visually revealed at another time, as the user may elect.

For product models that include tags, the tags may be used as key words to group component pieces having the same common feature or material 151. Components compri-sed of the same material, for example metal or plastic, can be grouped according to that material. The system essentially reads through existing tags in the model data and creates a list for each unique tag 153, then adds to that list all other components sharing the same tag. Where no preset tags are assigned, the system of the present invention scans all components for common geometric and/or volumetric sizes and shapes and material com-positions and then compares each in order to group identical 163 components accordingly 155, 157. If the system finds any identical pieces it defaults to operating under the assump-tion that these identical pieces are made of the same material and should look visually the same. Finally, the system identifies small group pieces 159. To do this, the volumetrically sorted list of pieces is used and proximity tests are run to measure the number of similarly sized parts within a set distance. This set distance is abstracted to the user but enables the user to make modifications to the "Grouping Tolerance" 161, which will determine how aggressively the system will attempt to group these small pieces. The user may then click on the return button to access group data information 162, as elected.

Figure 3:
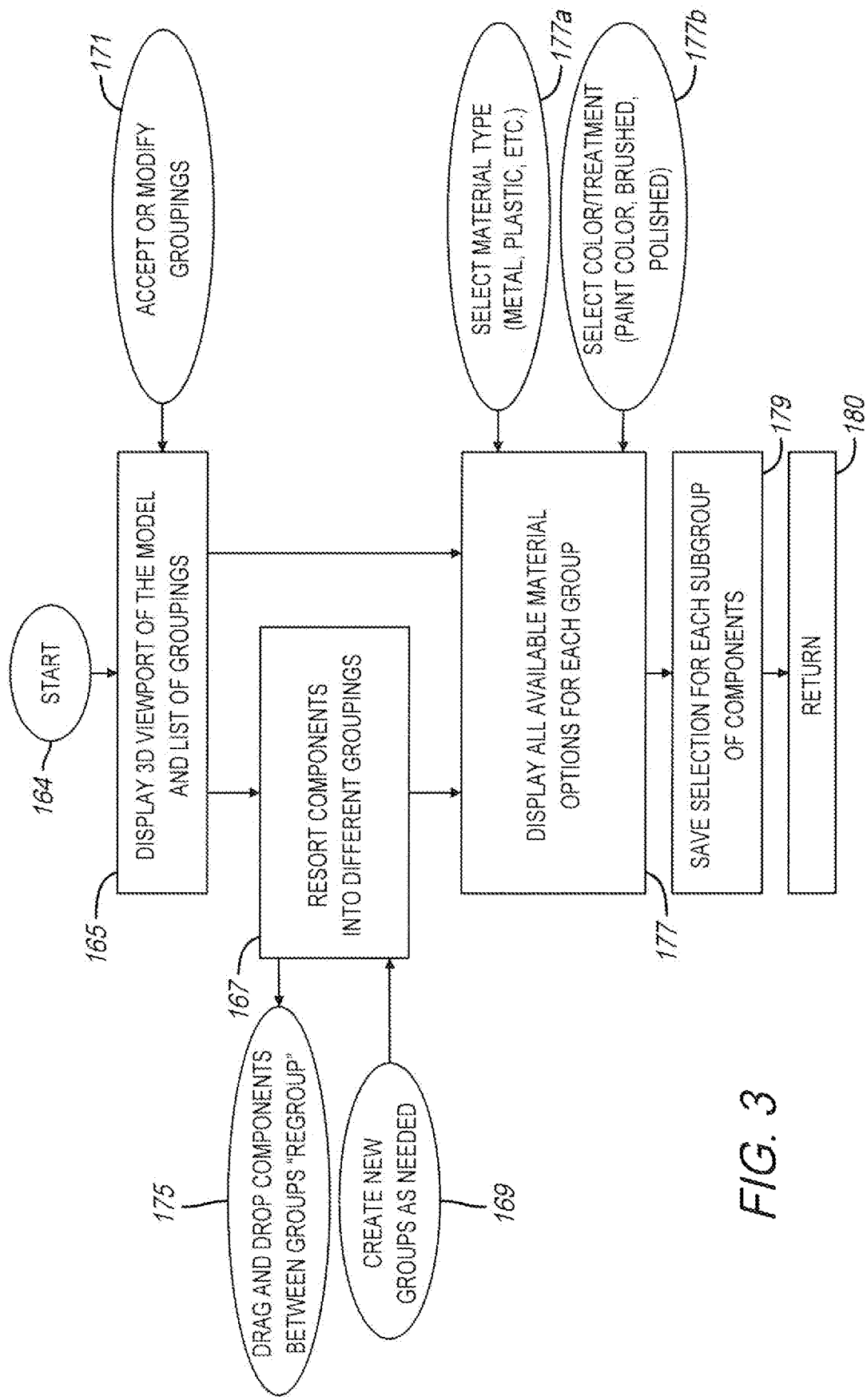
FIG. 3 is a flowchart illustrating a step integral to a computer-implemented improved system for producing studio-quality e-commerce product videos according to the teachings of the present invention.

Step 3 in the process, as shown in the flowchart in FIG. 3, starts 164 after the system has completed its analysis of the product model whereupon the user is presented with a 3D viewer window (view port) that displays the 3D model selected along with a list of the groupings 165 (e.g. components comprised of the same material) and simplifications (e.g. components grouped into single pieces or elimination of internal components) that the system has determined to be most optimal. Optimization of the model results in a more effi-cient system effectively reducing the amount of components that need to be selected from possibly many thousands to relatively few according to their consolidated groupings. At this stage, components can be transferred into different groups 167, eliminated altogether or included within a new grouping 169. The system may also be revised to affect the automa-tic interpretation of the product model. Again, incorrect groupings can be corrected 171, misidentification of components can be resolved and components can be properly color coded if they were previously not coded correctly.

All of the above steps can be accomplished simply by clicking on the item on the 3D model viewer window or by selecting among a series of drop down lists containing individu-al components in a grouping. An incorrectly grouped component can either be moved into another established group by clicking the button designated "Regroup" 175 or may be made the first element of a new group by clicking the button designated "Create a New Group" 169. In the "myPHONE" example, if the system misidentified the volume switch on the side of the "myPHONE" as being effectively part of the aluminum casing of the phone and, therefore, color-coded the same as the body of the "myPHONE", the user would have this opportunity to correct the grouping and clarify that the volume button is a unique and independent piece and should be kept separate and most likely made of a material other than that of the casing.

After the completion of the arrangement, designations or revisions of the various groupings or their component parts according to size and shape, for example, the user is presented with a variety of materials and colors from which to select for the components 177, 177a, 177b. This is achieved by employing a pop up window containing a drop down list of various materials, e.g. metal or plastic, after which the user is presented with color options to enable the customization of colors for all the various components. All selections, changes, etc. are then saved 179 at one time or may be saved when they occur at any other point during the process. The button 180 enables the user to return to any step in the system the user chooses.

Figure 4:
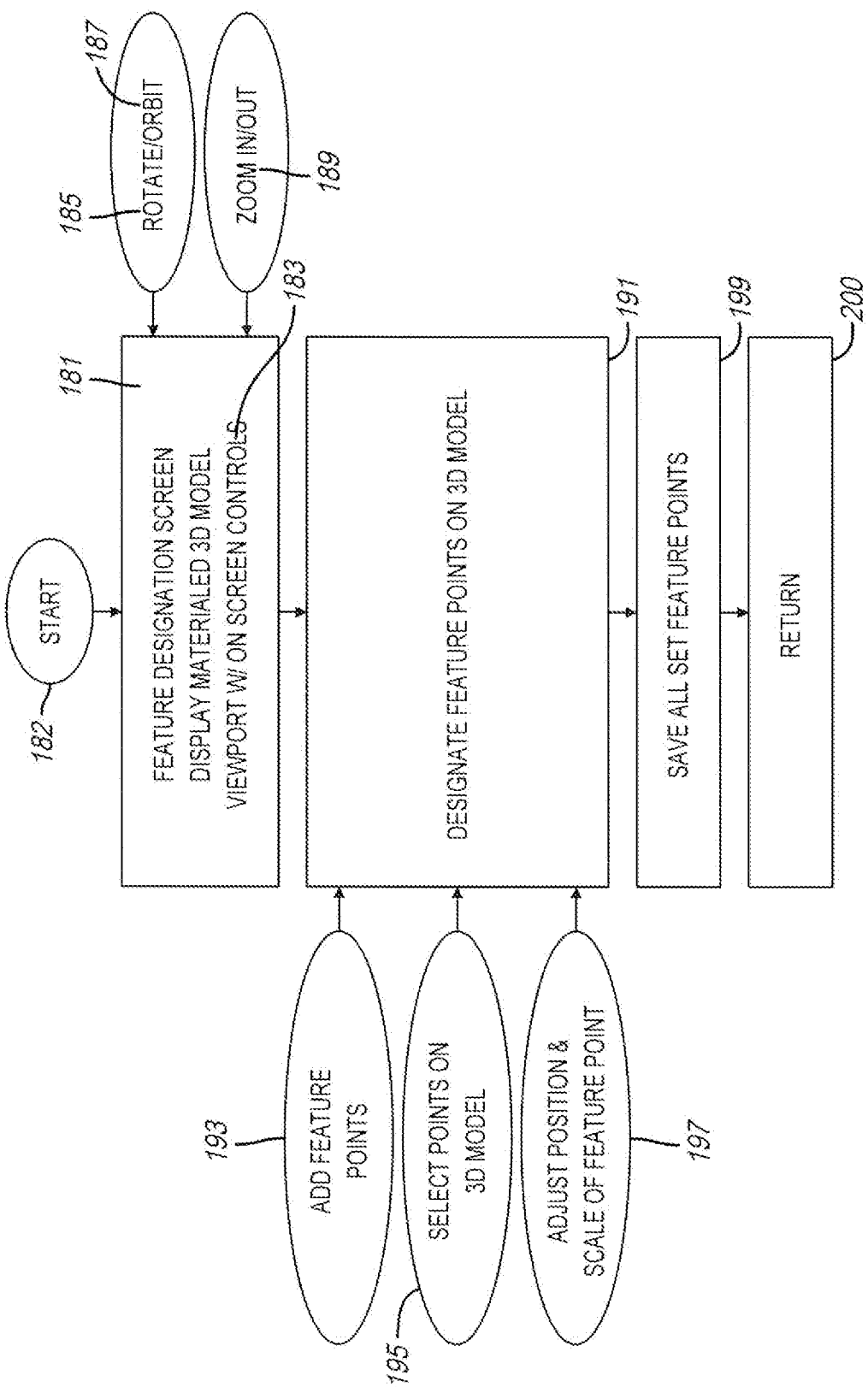
FIG. 4 is a flowchart illustrating a step integral to a computer-implemented improved system for producing studio-quality e-commerce product videos according to the teachings of the present invention.

Arriving at the next step in the process, as shown in the flowchart in FIG. 4, the user starts 182 with the system having a complete visual representation of the product and an approximate understanding of the component make up of the product 3D model, including material composition, and how these components appear, function and interrelate, as further described below. Thus, the user is presented with the Feature Designation Screen 181 which depicts a 3D preview of the 3D product model and several onscreen controls 183, including rotation controls 185 allowing the camera to orbit the product 187 and zoom-in and zoom-out control buttons 189. The onscreen controls also include input controls which, when operated by right-clicking the mouse, for example, enable the user to drag the product from side to side or to rotate it. A mouse wheel can also be scrolled up or down to zoom in on or out from the product.

The input controls enable the user to manipulate the 3D model in real time and locate its key feature points, which can be revised at any time, but initially serve to associate a set of physical components or region of the 3D model with feature designations 191. From an operational perspective, the user clicks the "Add Feature Point" button 193 and then clicks the 3D model part the user elects to associate with that feature. Placing the cursor over the feature point reveals controls that allow the repositioning and/or resizing of the feature point selected 195, 197.

After this step in the sequence, the feature points are saved 199. In the "myPHONE" product example, the user would typically select key features, including, for example, the screen, the speaker, the back piece of the body casing, and the camera. The user may then return 200 to any step in the sequence the user elects.

Figure 5:
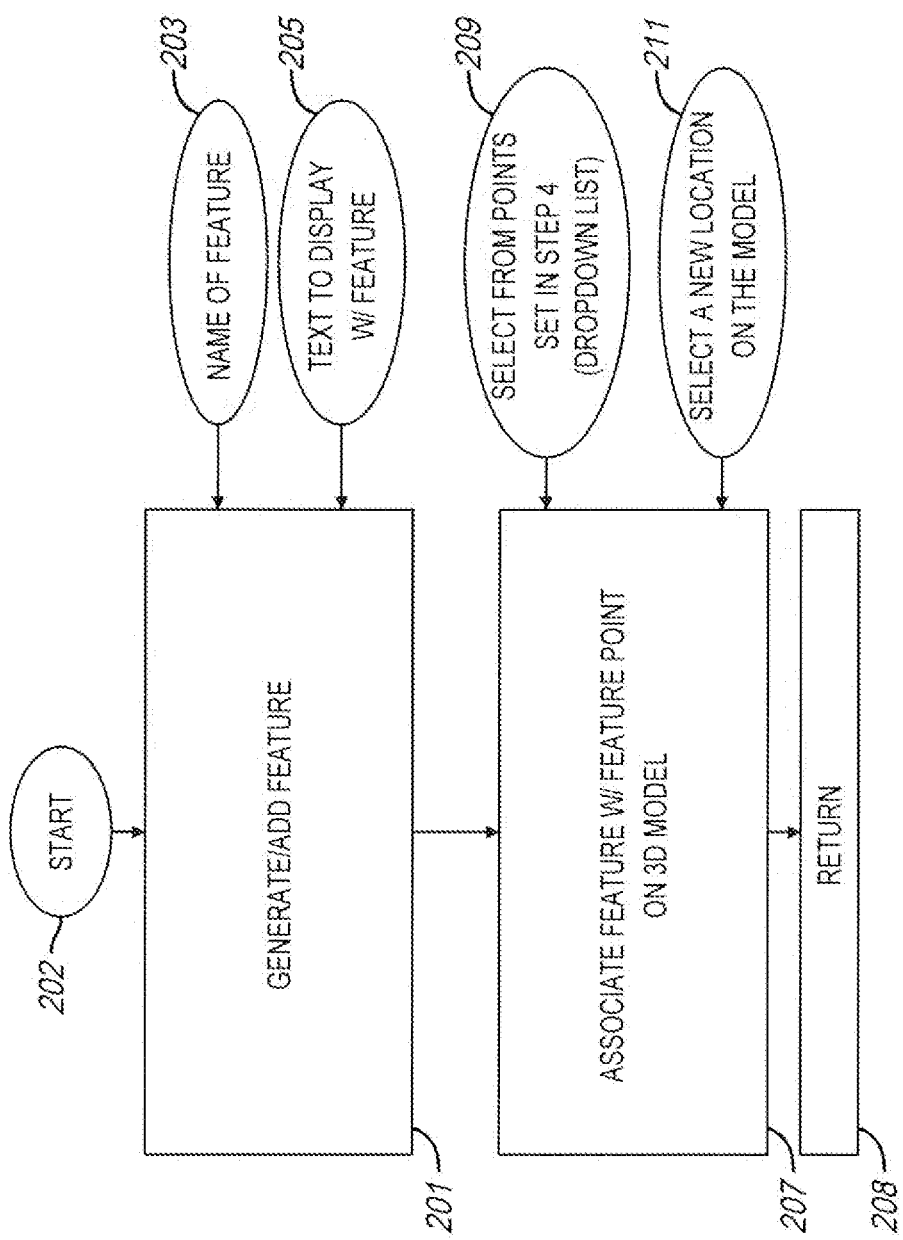
FIG. 5 is a flowchart illustrating a step integral to a computer-implemented improved system for producing studio-quality e-commerce product videos according to the teachings of the present invention.

As depicted in the flowchart in FIG. 5, the user starts 202 by incorporating each feature into the system and then highlights or explains each feature with the use of appropriate information for this purpose. This part of the process starts by clicking the "Creation/Add Feature" button 201 which brings up the feature creation tab for the new or added generated feature. The user may then provide information about the feature, including, for example, the identifier or name 203 of the feature and any onscreen text 205, including without limitation, facts regarding how individual components appear, function and interre-late relative to the feature the user wishes to display. In this way, any of the product feature points on the 3D model already selected from the points on the drop down list 209 can be associated with a particular feature or location now or existing 211. In doing so, the system automatically knows to associate the feature with a particular feature point on the 3D model 207 and to reveal the selected information associated with the feature. Using the "myPHONE" product example, one of the features is the high-resolution camera. The user inputs the name "Camera Feature" and then the text (or copy) "Featuring a New Ultra High-Resolution Camera" is shown alongside the feature. The camera location is then sel-ected from the list of feature points that were designated in the previous step or an entirely new feature of the model can be selected to focus on creating a new Feature Point in the process. Clicking on the return button 208 returns the user to any step in the sequence the user elects.

Figure 6A:
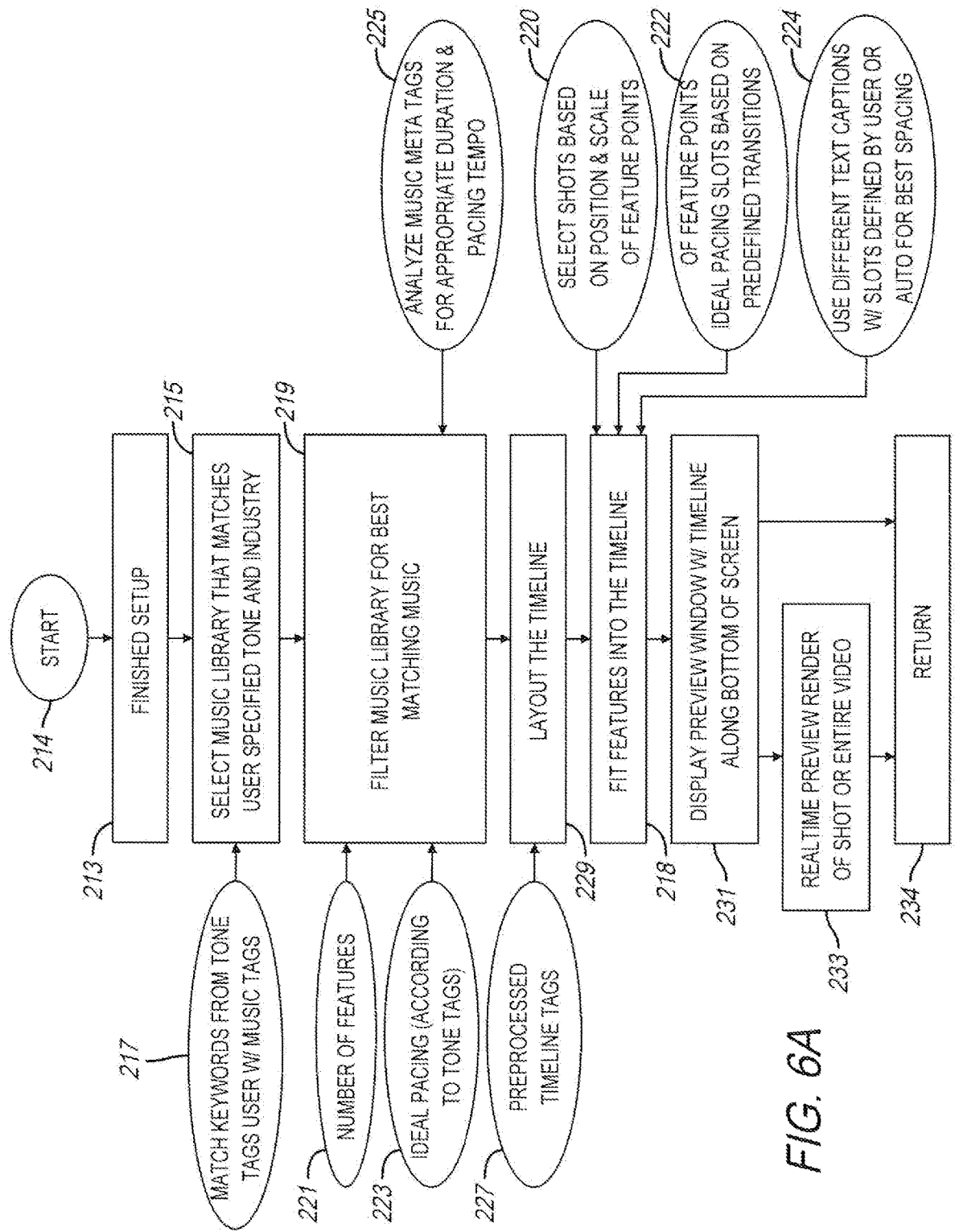
FIG. 6.a is a flowchart illustrating a step integral to a computer-implemented improved system for producing studio-quality e-commerce product videos according to the teachings of the present invention.
Figure 6B:
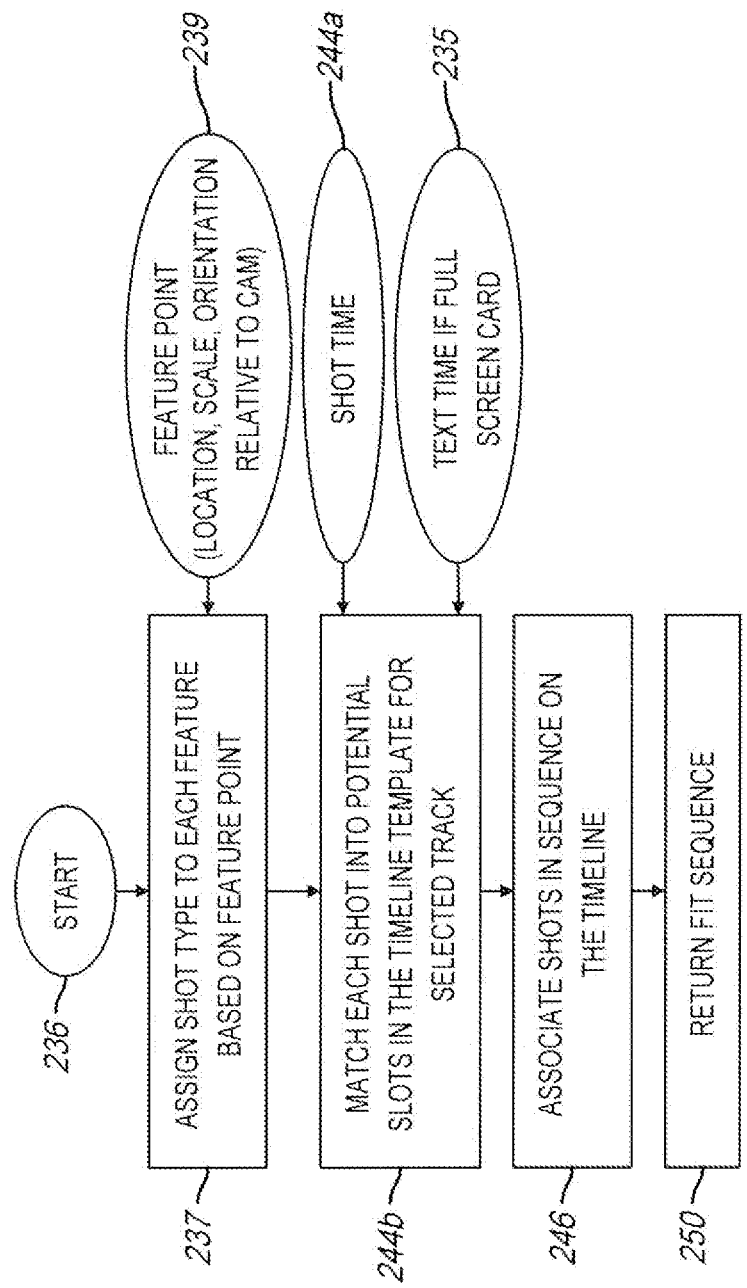

As shown in the flowchart in FIG. 6.*a*., once all the designated features have been inputted into the system, the user then starts 214 by clicking the "Finished Setup" button 213, which processes all the selections. Predicated upon the target industry, target audi-ence, type of product and the tone and theme identifying tags provided by the user earlier in the process, the system automatically selects or filters a set of music libraries 215 that will best match the user's creative goals for the product model. In this regard, a catalogue of music is provided with music selections associated with meta tags using the same keywords or terms chosen by the user to identify the branding theme or tone 217, target audience and target industry for the product. The system then analyzes the number and complexity (e.g. the amount of text) of the features 221 desired to be highlighted and, based on this information, the system narrows the selection of music options to a piece that will conform to the estimated duration and pacing 223, 225 of the product video.

The system will select from among the various options the best music choice 219 according to the aforesaid criteria and then lay out the feature content 229 according to a prepro-cessed timeline of the music 227. The preprocessing of the music, as described, also includes the identification of moments in the musical when certain transitions would be most appropriate. More specifically, this means analyzing the music files to identify the moments in each piece where there is a beat change or a heavy hit occurs. This informati-on can then be integrated into the system and, more particularly the video content itself. This process begins with tagged meta information previously provided. Eventually the system will automate a portion of this work (i.e. tagged meta information) by analyzing the beat and tempo of an audio file to determine the ideal edit points. At its more complex level it means that there are now an assortment of transition points and options that the system has identified as viable, which will then be used to optimally integrate the user's content.

After the initial video generation is complete, the user is presented with a preview screen with a complete automati-cally populated timeline of the video at the bottom 231. The preview window currently displays content relevant to the selected shot on the timeline and allows for the preview of both individual shots as well as the entire piece 233. The timeline spans the bottom of the screen and chronologically lays out the user's content with the beginning of the piece starting on the left and progressing across to the right side of the screen with the final shot at the very far right. The timeline displays the duration of the piece along the top and denotes different increments of time representing time stamps of the video moving along the timeline. Features are fit into the timeline 218 with shots selec-ted based on position and scale of feature points 220. Correct shots are inserted into ideal pacing slots based on predetermined transitions 222 using different text captions with slots defined by user or automatically for best pacing 224. By clicking return 234 the user may return to any step in the system user elects.

As shown in the flowchart in FIG. 6.*b*., the user starts 236 with the actual content of the timeline consisting of several tabs, each representing a feature or a general shot of the product. Each of these shots is individually generated based on the position of key fea-tures of the product and addition-ally may display text on screen provided by the user. This text can be in the form of a full screen shot that has just the text (a "full screen card") 235 that appears before or after the feature it describes. Shot types are assigned to each fea-ture based on feature point 237, including, for example, the location, scale, and orientation relative to the camera 239. Each shot according to content and shot time 244*a* is matched into potential slots in the timeline template for a selected track 244*b*. Shots are inserted in sequence onto the timeline 246. Clicking the return button accesses the fit sequence of the shots on the timeline 250. Alternatively, a partial text box can allow the text to be overlaid and positioned alongside the product. The system determines where in the screen space there is an appropriate sized void (space) in order to make sure that the automatically placed text is as legible as possible and does not overlap with the underlying model.

Figure 7:
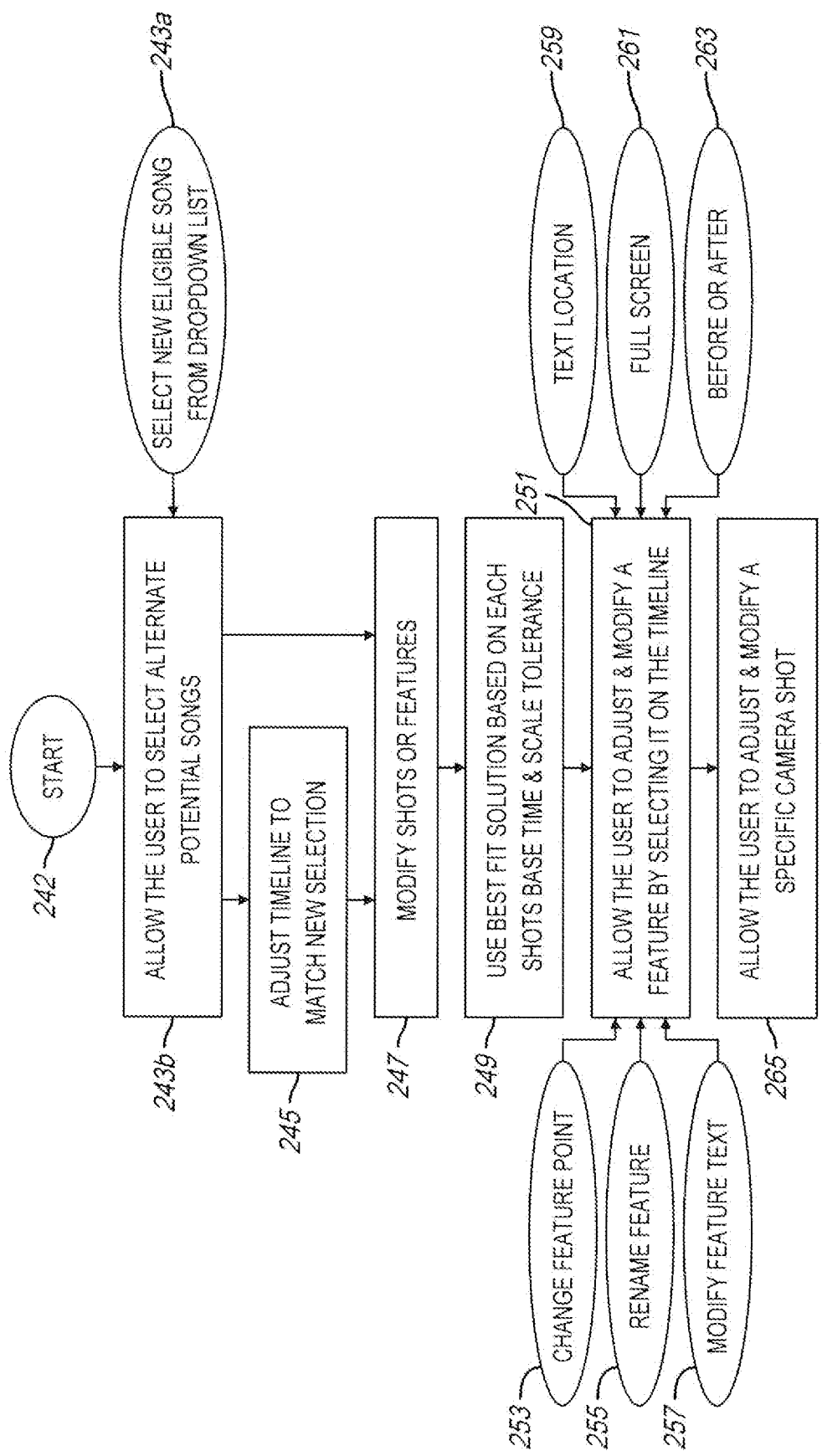
FIG. 7 is a flowchart illustrating a step integral to a computer-implemented improved system for producing studio-quality e-commerce product videos according to the teachings of the present invention.

As shown in the flowchart in FIG. 7, the user now has a complete video piece that the user can elect to retain, though there are also several ways in which the user can mod-ify the video. The user starts 242 by clicking on the music selection drop down list to present the user with a variety of eligible songs 243*a* from which the user may choose a selection. Should the user decide to select another song 243*b*, the timeline will automa-tically shift and scale in order to adhere to the ideal edit points of the new song selection 245. The system does this by finding a best fit solution with the existing shots and their base sizes (every shot has a base duration, for example, 2.5 seconds, and then a tole-rance that allows the system to flawlessly scale the shot up or down to match the ideal cut points nearest the segment) 249. This means that the piece will maintain as many of the same shots and features as the new song allows, but will allow the user, in a single click, to change the overall feel of the piece by simply selecting a new song. This type of change would normally require a great degree of similarity between the two songs.

An additional level of custom controls allows the user to modify any of the features and shots 247. By simply clicking on a tab on the timeline 251 the user can access the pro-perties associated with a given segment. These properties include the feature location on the product and allow the user to once again change the previously designated regions the feature shot should focus on or allows the user once again to select a new point 253 on the 3D model as its feature location. The basic information about the feature can also be edited. This includes both the name of the feature 255 and any on screen copy 257 that the user wants to associate with this feature. The copy settings also allow the user to decide if the text 259 should appear on a full screen card 261 before or after the shot 263, or if the text should be displayed in the shot on the screen along with the product. The user can also set a custom screen location for the text to appear by dragging the box where the user wants the text to appear on screen.

For each feature there is a set of recommended camera shots to use with that feature. These shots use a wide array of focuses (near focus vs far focus vs auto focus), camera angles (low to high, high to low, panning, etc), movement speeds (either in time to complete the move in seconds or units of speed), and more. The system automatically narrows down all available shots to a list of suggested shots based on the scale of the fea-ture point along with information about the product. It will even make suggestions based on which shots it determines to work best with the specific segment of the song during which it will be used. The user has the option to remain with the system's automatic selec-tion or choose from another recommended or custom shot. Many of the shots are designed to work with a custom focus point and will maintain focus on the physical location that the user defines as the feature point. Alternatively, some of the shots include unique effects that will modify or "rack" the focus as the virtual camera makes a specific move. Certain shots will also allow for the user to select an ideal speed or shot duration enabling the user to ensure that the most important features are adequately displayed 265.

Along with the specific feature shots, there may be opportunities to include non-fea-ture specific content. This might include overview shots and reveal shots, which would be listed alongside the feature shots and the two types would function in effectively the same way on the timeline. The only difference is that the non-feature shots are more dedi-cated to overview shots of the product rather than feature shots which exist to highlight or dem-onstrate specific features of a product. After the user makes modifications to a shot, the user can simply click the play button on that tab in order to access a preview of the shot in its then current form.

Figure 8:
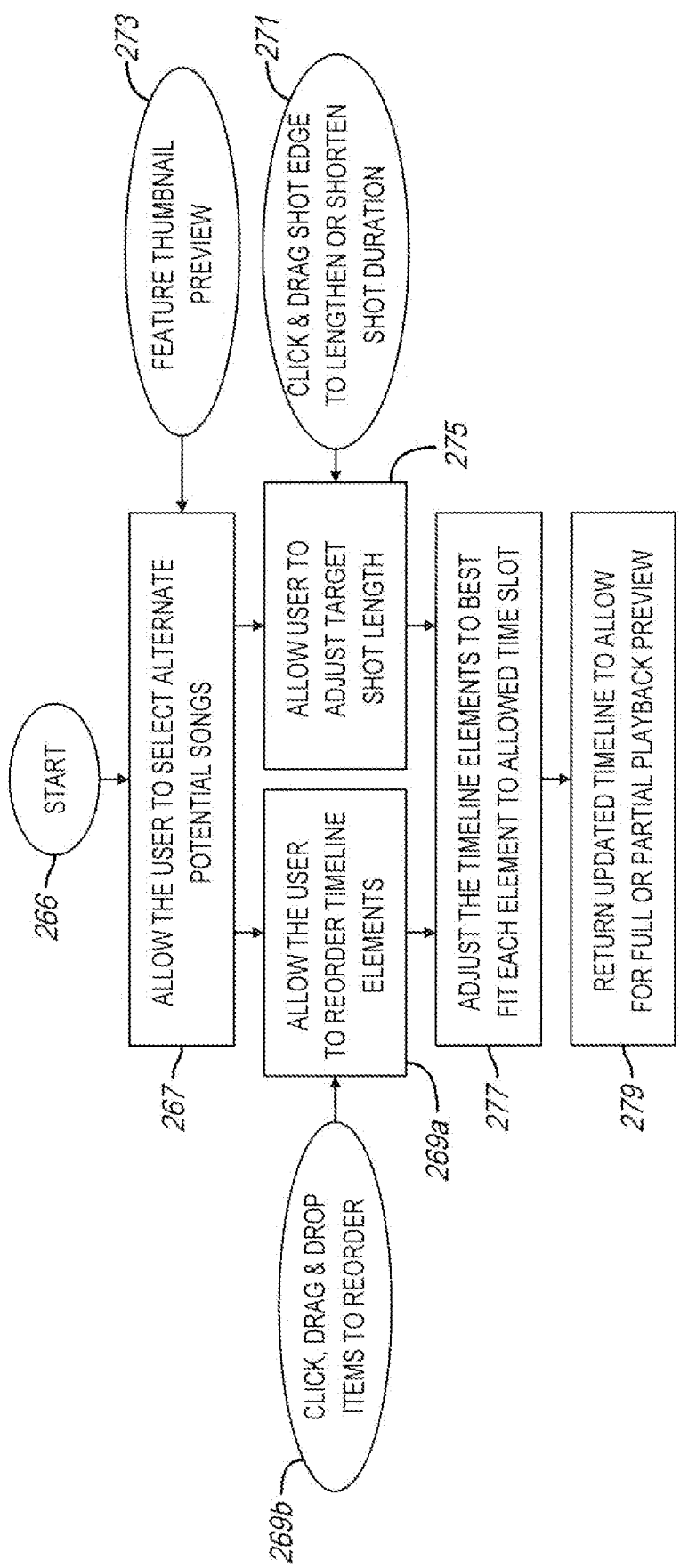
FIG. 8 is a flowchart illustrating a step integral to a computer-implemented improved system for producing studio-quality e-commerce product videos according to the teachings of the present invention.

As shown in the flowchart in FIG. 8, the user starts 266 by displaying a visual repre-sentation of the current timeline 267. In addition to being able to change the song and modify individual shots, the user can also rearrange the shots on the timeline. There may be some constraints regarding the use of certain types of shots, but for the most part the user can simply click and hold on a shot tab in order to allow the shot to be dragged around and even rearranged on the timeline. Once the user approves the placement of the shot on the timeline, the user can release the appropriate button and the shots will automatically rearrange and adjust themselves according to the new order of the timeline 269*a*, 269*b*. Additionally, the timeline user interface allows for the user to interact with the shots by clicking and dragging either the left or right edge of the shot tab in order to either increase or shorten the duration of a specific shot 271. By clicking on the right edge of a shot and dragging it to the right, the duration of the shot will be extended, and if dragged to the left the shot duration will be shortened 275. After rearrang-ing or changing the timeline elem-ents to best fit each element to the allowed time slot 277, the user can click the preview play button in the corner of the application window in order to trigger a full screen full length thumbnail preview of the product 273. Finally, the user may return to the updated timeline to allow for a full or partial playback review 279.

Figure 9:
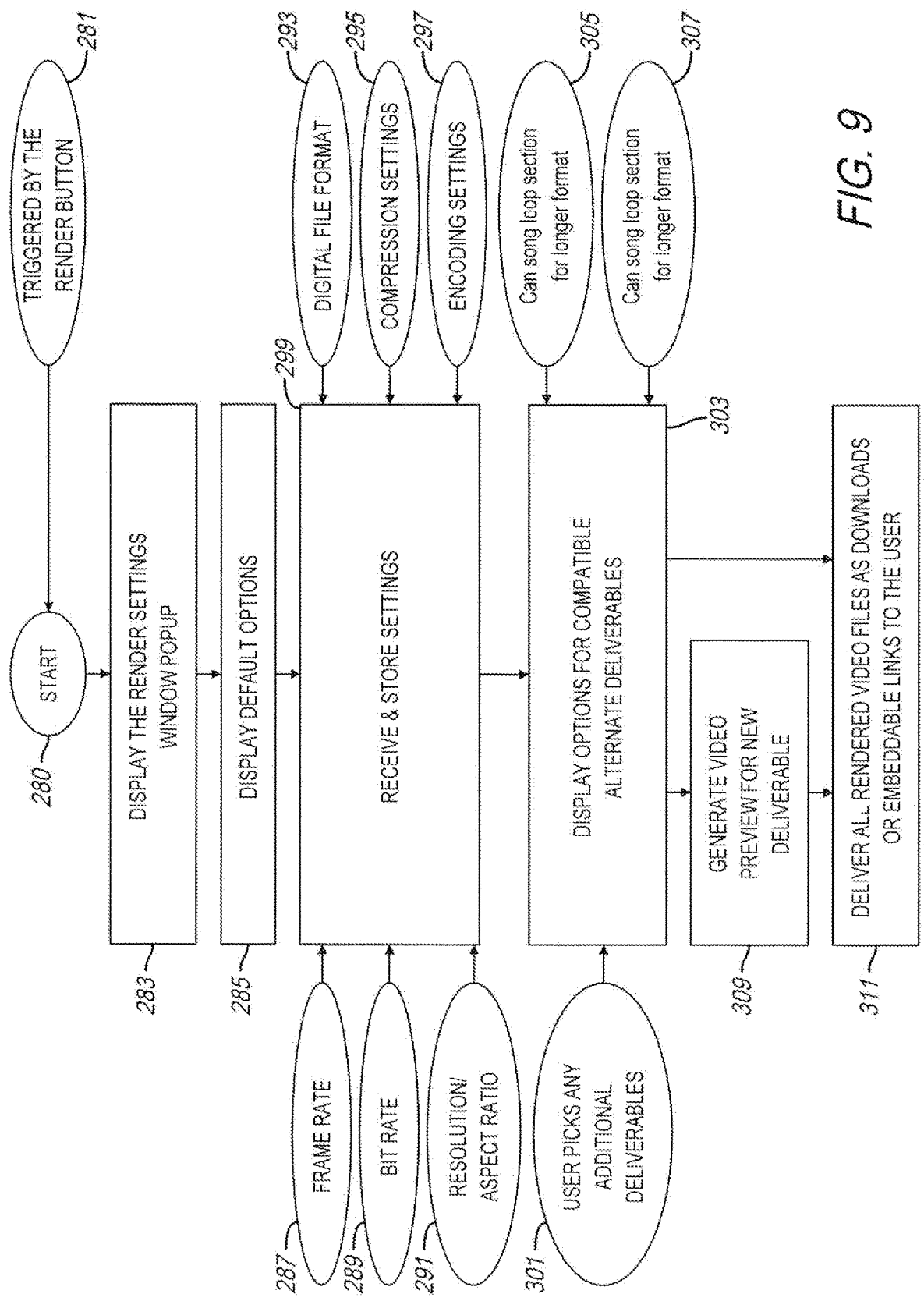
FIG. 9 is a flowchart illustrating a step integral to a computer-implemented improved system for producing studio-quality e-commerce product videos according to the teachings of the present invention.

As shown in the flowchart in FIG. 9, once the user is completely satisfied with the real time rendered preview of the content, the user starts 280 by clicking on the "Render" button 281 to initiate a settings popup window 283, which prompts the user for specific req-uirements of the deliver-ables. The frame rate 287, bit rate 289, resolution/aspect ratio 291, digital file format 293, compression 295 and encoding 297 settings are then received and stored 299. The user is presented with several digital deliverable options to choose from 301 to help select ideal default digital media file format options 285 and compression and encoding settings. Options are then displayed for compatible alternative deliv-erables 303. After making file format selections, the user can also utilize an important and differentiating strength of the system and select an entirely different deliverable asset, which is to say, rat-her than simply selecting a frame rate, resolution and bit rate, the user can select a longer or shorter piece. The system then selects a new track or adapts the current one by adding or removing the repeating middle of the song to lengthen the song loop 305 or shorten it 307 to match the new target duration. The content is then scaled dynamically to automatic-ally match the new ideal cut points. A video preview 309 is generated for new deliver-ables.

After selecting the target platform and adjusting the file settings, the "Okay" button is clicked. If there is an interest in an automatically generated 15 second teaser version of the video to be used on social media and/or a 60 second longer piece to play on the user's website homepage, the desired selection may be made. The system will automatically gen-erate these alternate deliverables and render out high quality versions. All deliverables of various lengths and aspect ratios are then either downloaded or the user is presented with streaming/embeddable links in the case of the Cloud rendering configuration. Where the local software configuration is utilized, the user is presented with a file browser popup and prompted to select a location for saving the videos. In any event, all rendered video files are deliv-ered as downloads or embeddable links 311.

While the invention will be described in connection with a certain preferred embo-diment, it is to be understood that it is not intended to limit the invention to that particular embodiment. Rather, it is intended to cover all alternatives, modifications and equivalents as may be included within the spirit and scope of the invention as defined by the appended claims.

The invention claimed is:
1. A computer-implemented method for creating a video rendering of a product, the method comprising:

establishing a connection to a web portal on a computer using a personal user name and password;

identifying and selecting, via the web portal, a 3D model of the product;

via the web portal, uploading the 3D model from the computer to an offsite server or downloading the 3D model from the offsite server to the computer;

receiving selections of product features or components of the 3D model for highlighting in the video rendering;

receiving a plurality of key points for the product features or components selected based at least in part on a user manipulating a visual representation the 3D model on the computer and selecting the plurality of key points on the visual representation of the 3D model associating locations of the plurality of key points with the product features or components;

creating a timeline comprising a plurality of predetermined edit points for switching between shots;

arranging on the timeline a plurality of shots that correspond to respective ones of the plurality of key points for the product features or components selected, the plurality of shots being arranged in a sequence based at least in part on a position of the plurality of key points; and creating the video rendering using the plurality of shots arranged in the sequence.

2. The method of claim 1, further comprising identifying at least one of a target industry, a target audience, or a branding theme for the product, and saving data corresponding to the at least one of the target industry, the target audience, or the branding theme in the 3D model.

3. The method of claim 2, further comprising:

providing a music catalog having music selections associated with key words that identify the target industry, the target audience, or the branding theme, and selecting music from the music catalog conformable to an estimated duration and pacing of the video rendering along the timeline.

4. The method of claim 1, further comprising providing information about one or more product feature or component, the information comprising one or more terms identifying the one or more feature or component, and onscreen text displaying facts explaining how the one or more feature or component appears, functions, or interrelates with another feature or component.

5. The method of claim 1, further comprising displaying a plurality of tabs on the timeline, each tab representing a shot of a product feature or component.

6. The method of claim 1, further comprising delivering the video rendering as a download or embeddable link.

7. The method of claim 1, further comprising identifying components of the product according to shared common materials, geometric sizes or shapes, or volumetric sizes or shapes, and grouping the components based on the shared common materials, geometric sizes or shapes, or volumetric sizes or shapes.

8. The method of claim 1, further comprising identifying internal components of the product, and eliminating the internal components from the 3D model, wherein the internal components are identified by simulating light rays emitted from a point around the 3D model, and directing the light rays generally toward the center of the 3D model.

9. The method of claim 1, further comprising organizing components of the 3D model, and transferring components into a different group, adding components to a Previously Presented group, or eliminating components from a group.

10. The method of claim 1, further comprising selecting the 3D model of the product from a group comprising a concept rendering, a technical engineering, a thematic drawing, a manufacturing drawing, a blueprint, a promotional material, and at least one other depicting the 3D model, each concept rendering, technical engineering, thematic drawing, manufacturing drawing, blueprint, promotional material, and at least one other depicting external and internal components of the product.

11. A computer-implemented method for creating a [3D] video rendering of a product, the method comprising:

receiving, on a computer, a selection of a 3D model of a product;

creating a timeline comprising a plurality of predetermined edit points and a sequence of a plurality of video portions corresponding to the predetermined edit points, each of the plurality of video portions being associated with one of a plurality of shot types, and each of the plurality of video portions being associated with a product feature or component of the product selected for highlighting in the video rendering;

presenting, on the computer, a preview window including the timeline;

modifying the timeline based at least in part on a user selecting a feature point on a visual representation of the 3D model of the product to be highlighted in the video rendering, the modified timeline further comprising an additional video portion associated with the selected feature point; and creating the video rendering using the sequence of a plurality of video portions and the additional video portion.

12. The method of claim 11, wherein each video portion is arranged in the timeline based at least on a position of a respective product feature or component in the 3D model.

13. The method of claim 11, further comprising selecting music from a music catalog based on a number of selected product features or components, and duration and pacing of the video rendering along the timeline.

14. The method of claim 13, wherein the music selected is associated with key words that identify a target industry, a target audience, or a branding theme for the product.

15. The method of claim 12, further comprising identifying a plurality of transitions in the music, and populating the timeline based on the plurality of transitions in the music.

16. The method of claim 11 further comprising displaying a plurality of tabs on the timeline or modified timeline, each tab representing a shot of a product feature or component.

17. The method of claim 11, wherein creating the timeline further comprises associating a video portion with a shot selected from a list of animations.

18. The method of claim 11, further comprising modifying a shot of a video portion based on a user manipulating the visual representation of the 3D model in the preview window.

19. The method of claim 11, further comprising providing information about the product features or components, the information comprising individual terms identifying product features or components, and onscreen text explaining how product features or components appear, function, or interrelate.

20. The method of claim 11, further comprising grouping components of the 3D model according to material, geometry, volume, size, or shape.

* * * * *